United States Patent
Renke et al.

(10) Patent No.: US 12,505,258 B2
(45) Date of Patent: Dec. 23, 2025

(54) ENFORCEMENT OF ATTESTATION OF READ-ONLY PROTECTED MEMORY DURING ATTESTATION VALIDITY PERIOD

(71) Applicant: Microsoft Technology Licensing, LLC, Redmond, WA (US)

(72) Inventors: Maxwell Christopher Renke, Sammamish, WA (US); Andrea Allievi, Seattle, WA (US); Giridhar Viswanathan, Redmond, WA (US); Benjamin M. Schultz, Bellevue, WA (US); Hari R. Pulapaka, Redmond, WA (US); David Guy Weston, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 18/575,055

(22) PCT Filed: Jul. 12, 2022

(86) PCT No.: PCT/US2022/073636
§ 371 (c)(1),
(2) Date: Dec. 28, 2023

(87) PCT Pub. No.: WO2023/288216
PCT Pub. Date: Jan. 19, 2023

(65) Prior Publication Data
US 2024/0338493 A1    Oct. 10, 2024

(30) Foreign Application Priority Data

Jul. 16, 2021  (LU) .................................. LU500442

(51) Int. Cl.
G06F 21/74        (2013.01)

(52) U.S. Cl.
CPC .................................. *G06F 21/74* (2013.01)

(58) Field of Classification Search
CPC ....................................................... G06F 21/74
See application file for complete search history.

(56) References Cited

U.S. PATENT DOCUMENTS 8,578,175 B2 * 11/2013 Boivie .................. H04L 63/061
                                                        713/189
9,531,547 B2 * 12/2016 Dabak ..................... G06F 21/53
(Continued)

FOREIGN PATENT DOCUMENTS

| CN | 101473333 A | 7/2009 |
| CN | 103051451 A | 4/2013 |
| CN | 106537873 A | 3/2017 |

OTHER PUBLICATIONS

Decision to grant a European patent pursuant to Article 97(1) received in European Application No. 22747564.7, mailed on Aug. 16, 2024, 2 pages.

(Continued)

*Primary Examiner* — Viral S Lakhia
(74) *Attorney, Agent, or Firm* — Workman Nydegger

(57) ABSTRACT

Enforcing attestation of read-only protected memory during attestation validity period. A client computer system identifies a change in a read-only protected memory protection status for a software component loaded at the client computer system. The client computer system then determines that a validity time period of an attestation report is unexpired. The attestation report comprises one or more attested properties, including one or more read-only memory protection (ROMP) attested properties for the software component. The client computer system also determines that at least one ROMP attested property for the software component is no longer valid due to the change in the read-only protected memory protection status for a software compo- (Continued)

nent. Based on the at least one ROMP attested property for the software component being no longer valid, the client computer system initiates a remedial action to prevent interaction of the software component with a relying party computer system.

18 Claims, 7 Drawing Sheets

(56) References Cited

U.S. PATENT DOCUMENTS

| | | | |
|---|---|---|---|
| 9,659,177 | B1 | 5/2017 | Juels et al. |
| 9,953,167 | B2 * | 4/2018 | Wooten ................. H04L 9/0861 |
| 10,614,223 | B2 * | 4/2020 | Abramovsky ........ G06F 21/577 |
| 11,609,996 | B2 * | 3/2023 | Falk ........................ G06F 21/64 |
| 11,687,656 | B2 * | 6/2023 | Palanki ................. H04L 9/3239 |
| | | | 726/1 |
| 12,105,807 | B1 * | 10/2024 | Bagh .......................... G06F 8/75 |
| 2018/0239901 | A1 * | 8/2018 | Jeansonne ............... G06F 21/52 |
| 2020/0084202 | A1 | 3/2020 | Smith et al. |
| 2020/0394308 | A1 * | 12/2020 | Angelo ................. G06F 21/577 |
| 2024/0143784 | A1 * | 5/2024 | Lee ........................... G06F 8/61 |
| 2024/0338493 | A1 * | 10/2024 | Renke .................... G06F 21/57 |

OTHER PUBLICATIONS

Communication under Rule 71(3) Received for European Application No. 22747564.7, mailed on Apr. 8, 2024, 9 pages.

Notice of Allowance Received for Chinese Application No. 202280050015.1, mailed on Apr. 30, 2025, 04 pages. (English translation Provided).

Office Action Received for Chinese Application No. 202280050015.1, mailed on Oct. 19, 2024, 7 pages (English Translation Provided).

Arnaud Jumelet et al., "Control the health of Windows 10-based devices," Oct. 26, 2022, XP055400355, [retrieved on Jan. 11, 2022] Retrieved from the Internet: Retrieved From: https://learn.microsoft.com/en-us/windows/security/threat-protection/protect-high-value-assets-by-controlling-the-health-of-windows-10-based-devices, 42 Pages.

International Search Report & Written Opinion issued in PCT Application No. PCT/US2022/073636, Oct. 7, 2022, 11 Pages.

Introducing Kernel Data Protection, a new platform security technology for preventing data corruption, accessed on: https://www.microsoft.com/en-us/security/blog/2020/07/08/introducing-kernel-data-protection-a-new-platform-security-technology-for-preventing-data-corruption/, Jul. 8, 2020, 8 pages.

Office Action and Search report Issued in Luxembourg Patent Application No. LU500442, mailed on Mar. 25, 2022, 10 Pages.

* cited by examiner

ENFORCEMENT OF ATTESTATION OF READ-ONLY PROTECTED MEMORY DURING ATTESTATION VALIDITY PERIOD

CROSS-REFERENCE TO RELATED APPLICATIONS

The present application is a U.S. National Stage of International Application No. PCT/US2022/073636, filed on 12 Jul. 2022, designating the United States and claiming the priority of Luxembourg Patent Application No. LU500442 filed with the Luxembourg Intellectual Property Office on 16 Jul. 2021. All of the aforementioned applications are incorporated herein in their respective entirety by this reference.

TECHNICAL FIELD

The present disclosure relates to systems, methods, and devices that ensure use of read-only protected memory.

BACKGROUND

In computing, read-only memory has historically been embodied as a data storage device (i.e., ROM) that stores data that can be read by a computer system, but which cannot be generally modified by the computer system. Read-only memory can be advantageous for storing immutable data and/or executable code that is immune from corruption and attacks from malicious parties (e.g., rewrite attacks). Due at least in part to these advantages, recent innovations have created mixed memory situations that add in-place protections for various operations (e.g., read, write, and/or execute) on portions of a read/write storage device, such as random-access memory (RAM); specifically, some technologies mark specific sections of an otherwise writeable memory space as read-only after load, providing protections against corruption and attacks.

In some situations, read-only memory protection (ROMP) technologies that create read-only protected memory are implemented using second level address translation (SLAT), or nested paging, which is managed by a hypervisor. As a result, standard user-mode or kernel-mode software cannot interact with, and corrupt, read-only protected memory. In one example, the Windows and Secure Kernel from Microsoft Corporation of Redmond, Washington supports a ROMP technology known as Kernel Data Protection (KDP). KDP provides at least two ways to operate on memory that is read-only protected by a hypervisor. First, static KDP allows a section of a binary image, loaded in an operating system (OS) kernel, to be read-only protected through use of SLAT in the hypervisor; when the section is read-only protected, any attempt to write to the underlying physical memory backing the section will—by design—result in a system crash. Second, dynamic KDP allows any software running in kernel mode to request a chunk of pre-initialized, read-only protected memory; the returned memory can be freed, but any attempt to write to the read-only protected memory will—by design—result in a system crash. The two technologies can be used singly, or in combination, to create highly protected data which is tamper resistant to attacks to the kernel. Other ROMP technologies are implemented in hardware, such as by using a hardware-based trusted execution environment (ARM TrustZone, Intel Software Guard Extensions (SGX)), hardware-based page table (e.g., HLAT), and the like.

With the recent proliferation of security technologies that provide code and control flow integrity (e.g., Code Integrity and Control Flow Guard in the WINDOWS OS from Microsoft Corporation), the landscape for attacks is shifting towards data corruption. ROMP technologies, such as KDP and similar technologies, help to protect against these attacks by preventing modifications to read-only-at-rest data variables.

BRIEF SUMMARY

While ROMP technologies, such as KDP, are effective at protecting against corruption and attacks at a computer system, there is no solution for determining if a particular software component (e.g., OS, driver, and/or application) executing at a client computer system (client system) is protected by a ROMP technology when a relying party computer system (relying system) communicates with that client system. At least some embodiments described herein address this shortcoming by enabling generation of an attestation report that certifies that at least one software component executing at a client system is protected by a ROMP technology, such as KDP. In embodiments, this attestation report comprises one or more attested properties. In embodiments, these attested properties comprise one or more of: a binary image name for which ROMP is enabled, a binary image version, a digital signature at load time of the binary image, a base offset of a read-only protected memory section allocated to the binary image, a size of the read-only protected memory section, at least one attribute of the read-only protected memory section (e.g., whether the binary image can be unloaded, whether a read-only protected memory section is freeable or non-freeable, etc.), a status of a secure ROMP technology (e.g., KDP TrustZone, SGX, HLAT, etc.) protecting an underlying virtual to guest physical address mapping, a set of physical pages underlying the read-only protected memory section, an indication of content of the read-only protected memory section (e.g., at least one checksum, hash, cryptographic hash, etc.), or a range list of the memory content. In embodiments, the relying system uses this attestation report to verify these properties prior to sending data to the client system and/or prior to relying on data received by the client system.

In one example scenario, gaming software at a relying system (e.g., corresponding to a player, a game server, etc.) may want to verify that an anti-cheat component at a client system (e.g., corresponding to another player) has not been compromised (e.g., by modifying a driver, or data used by the driver) prior to engaging in a multi-player game with the client system. In this scenario, and in accordance with the embodiments herein, the client system uses a ROMP technology, such as KDP, to read-only protect at least a portion of memory corresponding to this anti-cheat component. The relying system obtains a cryptographically secured attestation report. The attestation report certifies one or more properties of the anti-cheat component, including at least one property relating to enablement of ROMP for the anti-cheat component. The relying system uses this attestation report to verify integrity of the anti-cheat component, based at least on verifying the presence and enablement of ROMP for the anti-cheat component. Based at least on verification of the integrity of the anti-cheat component, the gaming software at the relying system engages in the multi-player game with the client system.

In another example scenario, key distribution software at a relying system (e.g., corresponding to an audio or video distribution service, etc.) may want to verify that a media player at a client system (e.g., corresponding to a media consumption device) has not been compromised prior to sending a decryption key to the client system. The client system uses a ROMP technology to read-only protect at least a portion of memory corresponding to the media player. The relying system obtains a cryptographically secured attestation report, and uses this attestation report to verify integrity of the media player, based at least on verifying the presence and enablement of ROMP for the media player, and sends the client system the decryption key after a successful verification.

In some embodiments methods, systems, and computer program products are directed to attesting to read-only protected memory. Based on a communications request, a client computer system receives a nonce from a relying party computer system. The client computer system generates attestation evidence. The attestation evidence comprises one or more attested properties, including one or more ROMP attested properties for read-only protected memory allocated to a software component loaded at the computer system, the nonce, and a system security claim. The client computer system sends the attestation evidence toward an attestation service computer system. Based on sending the attestation evidence, the client computer system participates in a relying communication with the relying party computer system.

Technical effects of attesting to read-only protected memory in a distributed system include allowing verifiable assurances to be made of system state (e.g., state of a client system), improving the foundational capabilities for secure computing. These assurances, in turn, enable a relying system to objectively gauge its level of trust in the client system, which facilitates secure data communications between the client system and the relying system.

In embodiments, an attestation report has a finite validity window during which a relying system can rely on attested properties regarding a ROMP status for a software component at a client system. For example, a validity window may be based on a particular time at which an attestation report becomes invalid, a particular post-issuance validity time limit, etc. However, the attested-to ROMP status for the software component can change at the client system during this validity window (e.g., based on reloading of a driver). As such, a relying system could rely on attested properties that are no longer valid. At least some additional embodiments described herein take proactive remedial actions at a client system if attested-to properties regarding a ROMP status for a software component are no longer valid during an attestation validity period. Thus, these embodiments operate to enforce attestation of read-only protected memory during attestation validity period, and this enforcement may be determined by another attested property. For example, if the ROMP status for a software component changes during an attestation validity period, remedial actions may include suspending one or more processes corresponding to software component until the end of the attestation validity period, terminating one or more processes corresponding to software component, blocking one or more communications from the software component, notifying the relying system, invalidating a cryptographic key, making a cryptographic key no longer accessible, and the like.

In other embodiments, methods, systems, and computer program products are directed to enforcing attestation of read-only protected memory during attestation validity period. A client computer system identifies a change in a ROMP status for a software component loaded at the client computer system. The client computer system then determines that a validity time period of an attestation report is unexpired. The attestation report comprises one or more attested properties, including one or more ROMP attested properties for read-only protected memory allocated to the software component. The client computer system also determines that at least one ROMP attested property for the software component is no longer valid due to the change in the ROMP status for a software component. Based on the at least one ROMP attested property for the software component being no longer valid, the client computer system initiates a remedial action to prevent interaction of the software component with a relying party computer system.

Technical effects of enforcing read-only protected memory during an attestation validity period include promoting computer security by ensuring that a relying party can actually rely on attestations made by a client computer system during the entire validity duration of an attestation report.

Notably, either embodiment promotes the use of RAM for read-only protected memory, rather than requiring a separate pool of physically write-once memory. As will be appreciated, using a separate pool of physically write-once memory adds hardware costs and presumes foreknowledge of how much of memory needs to be read-only protected. Thus, promoting the use of RAM for read-only protected memory reduces physical hardware requirements, and increases flexibility in use of physical hardware.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
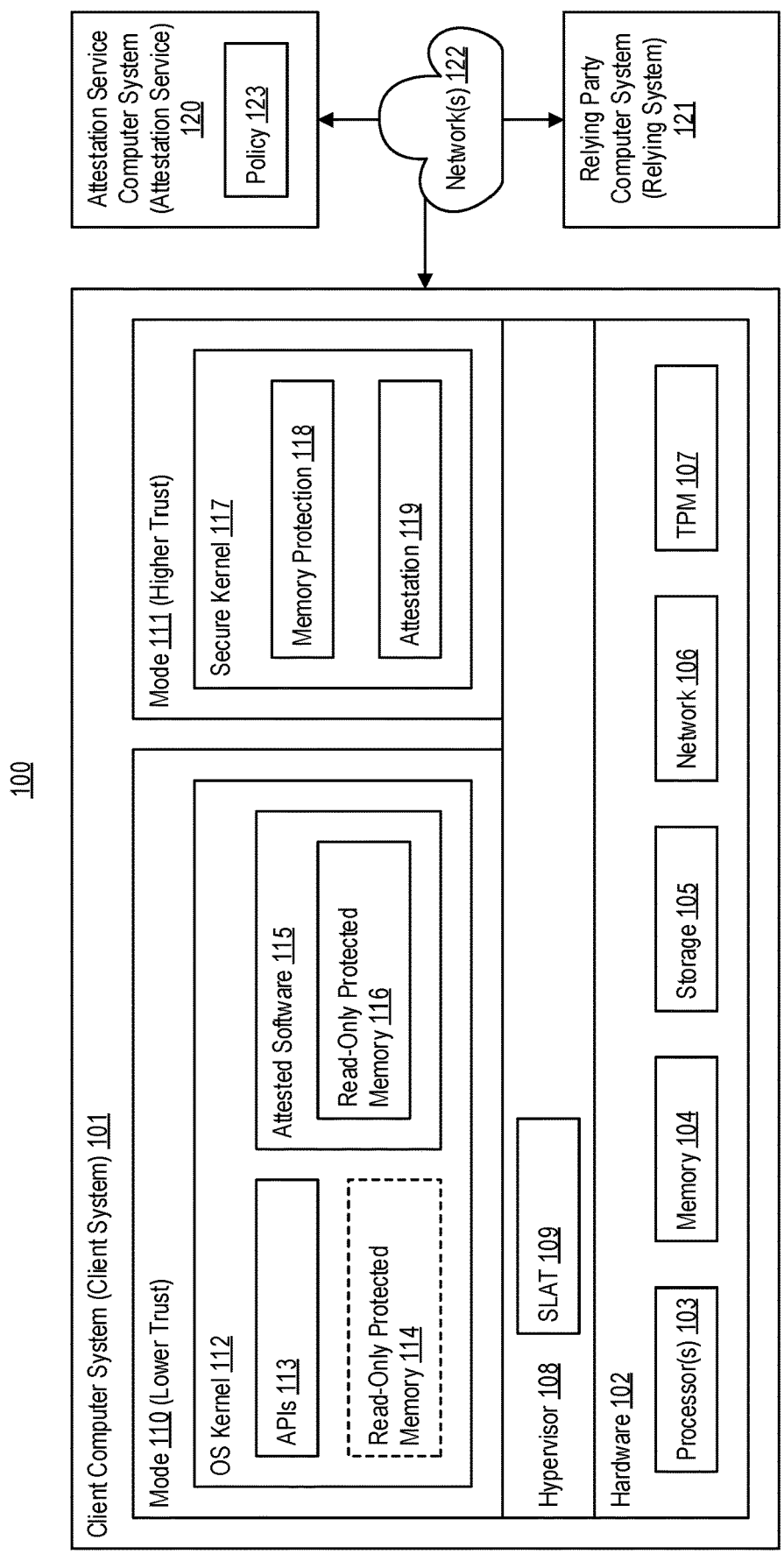
FIG. 1 illustrates an example computer architecture that facilitates attestation of the presence of ROMP in a distributed computing environment, and enforcement those protections during an attestation validity period.

FIG. 1 illustrates an example distributed system architecture 100 that facilitates attestation of the presence of ROMP in a distributed computing environment, and enforcement those protections during an attestation validity period. As shown, distributed system architecture 100 comprises a client computer system 101 (client system 101), an attestation service computer system 120 (attestation service 120), and a relying party computer system 121 (relying system 121), which—at least in FIG. 1—are communicatively interconnected by one or more network(s) 122. Although illustrated separately, in some embodiments the attestation service 120 and the relying system 121 are combined into the same computer system. Although illustrated as being separated from the client system 101 by network 122, in some embodiments the relying system 121 executes within a secured context executing at client system 101.

In embodiments, one or more of the client system 101, the attestation service 120, and the relying system 121 comprise computing hardware (e.g., processor(s), memory, disk storage, network adapter, etc.). Referring to client system 101 specifically, FIG. 1 illustrates additional detail of hardware 102 of client system 101. As shown, this hardware 102 includes processor(s) 103, memory 104 (e.g., main memory, such as RAM), storage 105 (e.g., disk storage, ROM, etc.), a network adapter (network 106), and a trusted platform module (TPM 107).

In general, distributed system architecture 100 operates to attest to the presence and status of read-only protected memory 116 allocated to a software component (attested software 115) executing at the client system 101. In embodiments, the read-only protected memory 116 is a chunk of memory allocated to the software component from memory 104, and to which ROMP is applied. As will be explained in detail infra, the attestation service 120 generates an attestation report based on evidence generated by the client system 101, and the relying system 121 uses this attestation report to verify that the attested software 115 satisfactorily utilizes read-only protected memory 116 (e.g., based on a policy 123). After a successful verification, the relying system 121 makes a relying communication(s) with the client system 101.

By way of example, FIG. 1 illustrates a configuration of client system 101 that could, as an example, be used to attest to the status of read-only protected memory 116 created using a software-based ROMP technology, such as KDP. However, the principles described herein are applicable to a wide variety of software- and/or hardware-based ROMP technologies, such those using KDP, TrustZone, SGX, HLAT, and the like.

In FIG. 1, the hardware 102 at the client system 101 executes a hypervisor 108. The hypervisor 108, in turn, creates at least two security modes (e.g., partitions or virtual machines), including at least a lower-trust mode (mode 110), and a higher trust mode (mode 111). Other security modes are possible, such as a third security mode corresponding to the relying system 121 (e.g., when the relying system 121 executes within a secured context at client system 101).

As shown, a secure kernel 117 executes within the context of mode 111, while a more traditional OS kernel 112 executes within the context of mode 110. Other software, such as attested software 115, executes within the context of the OS kernel 112. As an example, in some embodiments the attested software 115 is a driver. As shown, the secure kernel 117 comprises a memory protection component 118, which operates to apply ROMP to allocations from memory 104. In some embodiments the memory protection component 118 accomplishes these protections based, at least in part, on memory page permissions specified in SLAT 109 tables managed by the hypervisor 108. In FIG. 1, the attested software 115 is illustrated as having at least one read-only protected memory allocation (read-only protected memory 116) for use by the attested software. The OS kernel 112 is also illustrated as potentially having at least one other read-only protected memory allocation (read-only protected memory 114) for use by the OS kernel 112.

In a particular example, the hypervisor 108 implements Virtual Secure Mode (VSM) from Microsoft Corporation, and each hypervisor-created mode corresponds to a different Virtual Trust Level (VTL)—e.g., VTL 0 for mode 110 and VTL 1 for mode 111. In this particular example, an NT kernel (e.g., OS kernel 112) runs in VTL 0 (mode 110), while a Secure Kernel runs VTL 1 (mode 111). In this particular example, the memory protection component 118 implements a software-based memory protection technology, such as KDP, which is usable to protect drivers and software running in the NT kernel (e.g., the OS code itself) against data-driven attacks.

In some implementations, KDP supports two types of protections: static KDP and dynamic KDP. In implementations, static KDP enables software running in kernel mode within VTL 0 to statically protect a section of its own image from being tampered with from any other entity in VTL 0. In implementations, dynamic KDP enables kernel-mode software to allocate and release read-only protected memory from a "secure pool" in memory 104, with the memory returned from the pool only permitted to be initialized once (i.e., it is read-only after initializations). In implementations, since memory managed by KDP is verified by the Secure Kernel within VTL 1, and is protected using SLAT tables by the hypervisor, no software running in the NT kernel within VTL 0 is able to modify the content of the protected memory.

In embodiments, the attested software 115 requests allocation of read-only protected memory 116 based on making a call to APIs 113 provided by the OS kernel 112, which in turn makes a call to the secure kernel 117 through the hypervisor 108.

For example, continuing the KDP example, a software component such as a driver (e.g., attested software 115), which wants a section of its image protected through static KDP can call an API (e.g., APIs 113). Using this API call, the software component specifies an address located inside a data section of its binary image and, optionally, a size of the protected area and/or some flags. When the API call is successful, memory protection component 118 operates to ensure that the memory backing the static section (e.g., read-only protected memory 116) becomes read-only for VTL 0 (e.g., mode 110) and protected through a SLAT (e.g., SLAT 109). In implementations, unloading a software component that has a protected section is not allowed, and attempting to do results in a fatal error (e.g., a "blue screen" error, a kernel panic, etc.). In some implementations a software component is permitted to specify that it can be unloaded (e.g., via a flag provided in connection with the API call just described). In this case, the kernel (e.g., OS kernel 112) is permitted to unload the target software component; when this happens, the protected section is unprotected and then released.

In another example, and continuing to the KDP example, a software component such as a driver (e.g., attested software 115), which wants a section of its image protected through dynamic KDP allocates and initializes read-only protected memory using services provided by a secure pool, which is managed by the memory protection component 118 in the secure kernel 117. In implementations, the software component first creates a secure pool context associated with a tag; then, the software component's future memory allocations are associated with the created secure pool context. In implementations, after the context is created, read-only allocations (e.g., read-only protected memory 116) can be performed through an API call (e.g., APIs 113), and in implementations the software component can specify the size of the allocation and the initial buffer from where to copy the memory. In implementations, memory protection component 118 ensures that the returned memory region can't be modified by any entity running in VTL 0. Similar to static KDP, in implementations the memory region can't be freed or modified by default. However, in implementations the software component can specify at allocation time that the allocation is freeable (e.g., using a flag).

In FIG. 1, the secure kernel 117 comprises an attestation component 119 (e.g., a secure enclave). In general, the attestation component 119 measures various aspects of the client system 101 and submits those measurements as evidence to the attestation service 120 and/or to the relying system 121. Upon receipt of the evidence (from the client system 101 and/or from the relying system 121), the attestation service 120 generates an attestation report that can be used by the relying system 121 to validate one or more security properties of the client system 101, and to ensure that the client system 101 is a desired (e.g., protected) state. In general, the evidence includes a system security claim comprising boot-time measurements that are loaded into secure hardware (such as the TPM 107). In embodiments, this evidence validates that one or more of the OS kernel 112 or the secure kernel 117 are in a trusted state.

In accordance with the embodiments herein, these measurements are extended to include one or more properties relating to the attested software 115 and/or read-only protected memory 116, and in particular to a state of the read-only protected memory 116 as it relates to the attested software 115. Thus, in embodiments, the attestation component 119 provides a mechanism to report data that enables the client system 101 to perform reliable and secure attestation to the relying system 121, so that the relying system 121 can ensure that the client system 101 is protecting a given memory region (or set of memory regions) with a secure ROMP technology, such as KDP, TrustZone, SGX, HLAT, etc.

In some embodiments the attestation component 119 attests that a particular binary image (from which the attested software 115 executes) is protected, such as by binary name and version number, and the relying system 121 infers from that attestation that the data it is concerned about is protected. In additional embodiments, however, the attestation component 119 attests to additional details to offer additional granularity to help the relying system 121 understand what memory is protected. As examples, this may be the memory region address and/or an indication of memory contents (e.g., driver data checksum or hash, read-only protected memory 116 checksum or hash).

In some embodiments the relying system 121 receives a generic attestation report with properties relating to the attested software 115 and makes its own attestation decisions. In some embodiments the relying system 121 submits one or more attestation criteria (e.g., information the relying system 121 needs to validate in the attestation report, and thus to decide on whether to proceed in trusting the attested software 115) to the attestation service 120 as a policy 123. In some embodiments the attestation service 120 uses this policy 123 to decide what to include in the attestation report and/or if the client system 101 is attested.

Figure 2:
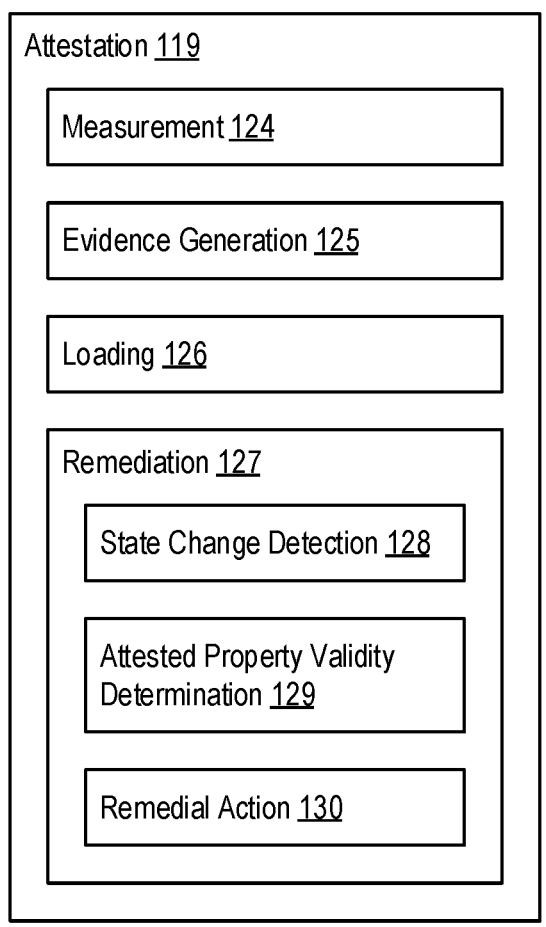
FIG. 2 illustrates an example of an attestation component.

FIG. 2 illustrates an example 200 of additional details of the attestation component 119. In example 200 the attestation component 119 comprises a measurement component 124 for gathering measurements at client system 101 (e.g., boot-time measurements of the TPM 107, properties of the attested software 115 and the read-only protected memory 116, etc.), and an evidence generation component 125 for generating evidence for submission to the attestation service 120. In some embodiments the attestation component 119 also comprises a loading component 126 for initiating loading of the attested software 115 and/or a remediation component 127 that operates to ensure that the attested software 115 cannot operate contrary to the attested properties in an attestation report while that attestation report is valid.

Figure 3A:
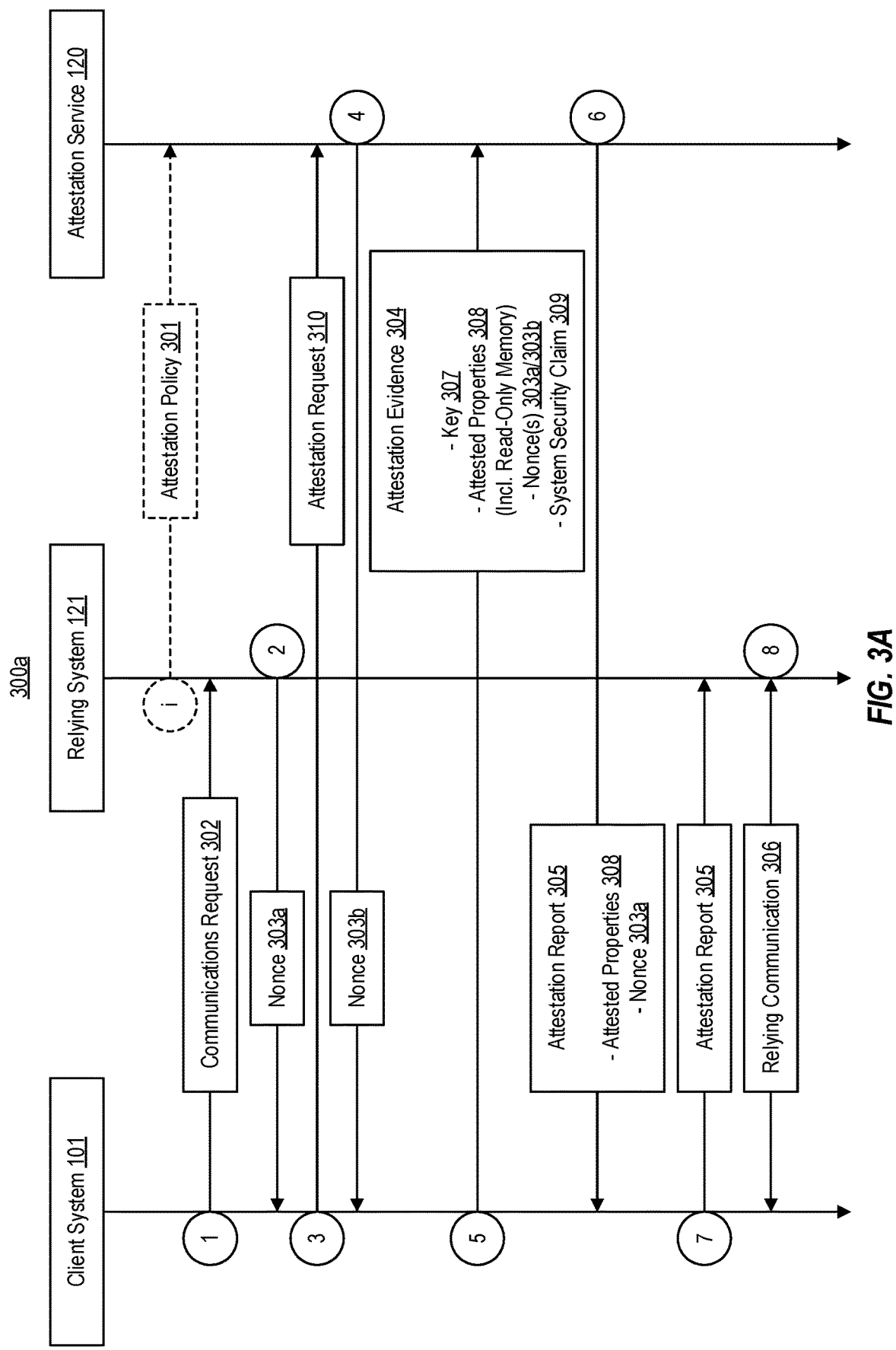
FIG. 3A illustrates example timing of communications for attesting to read-only protected memory in a distributed system, in which a client system communicates with an attestation service directly.
Figure 3B:
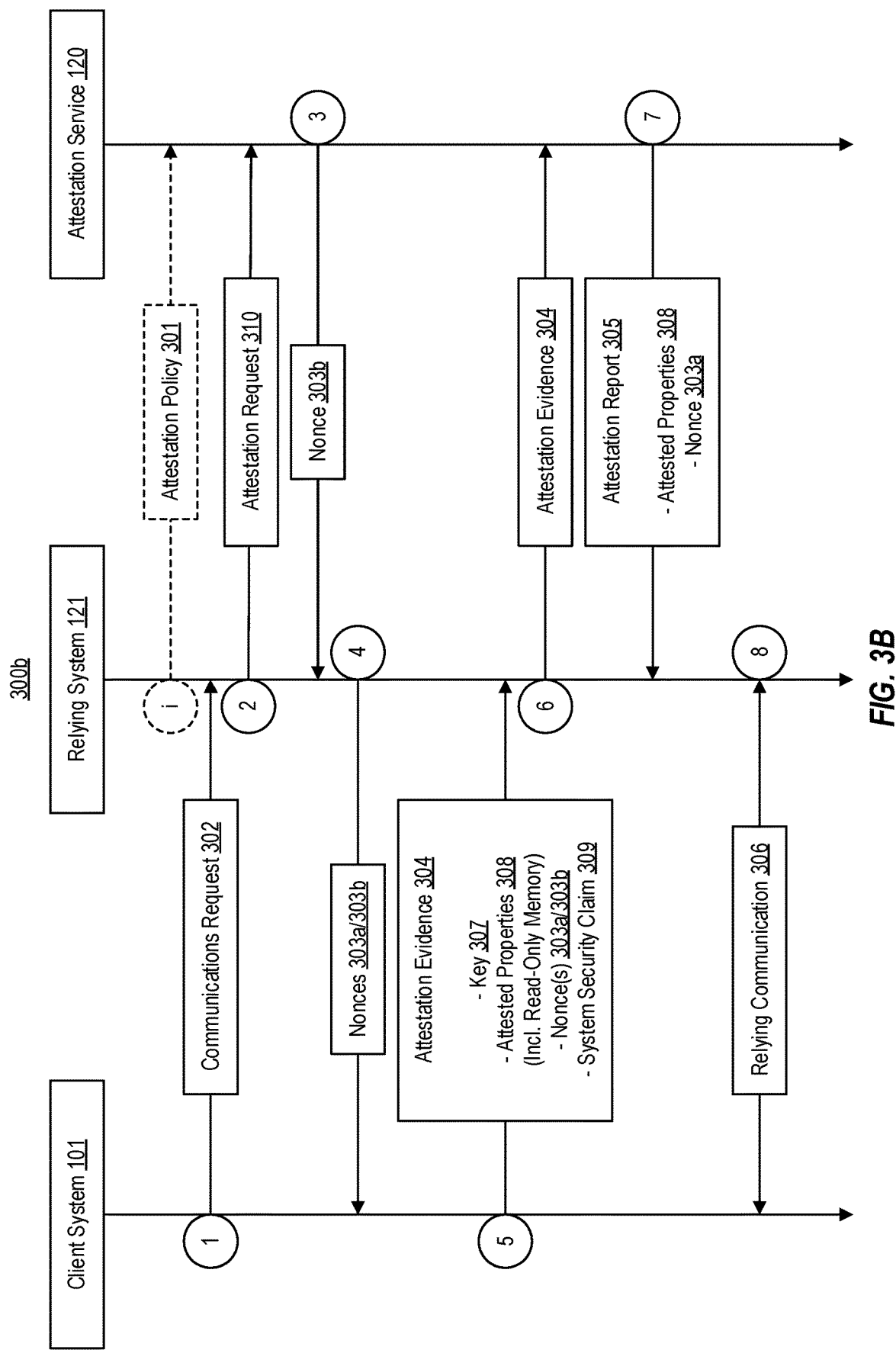
FIG. 3B illustrates example timing of communications for attesting to read-only protected memory in a distributed system, in which a client system communicates with an attestation service via a relying system.

FIGS. 3A and 3B illustrate examples 300a/300b of timing of communications for attesting to read-only protected memory in a distributed system, including communications between the client system 101, the attestation service 120, and the relying system 121. In example 300a the client system 101 communicates with the attestation service 120 directly, while in example 300b the client system 101 communicates with the attestation service 120 via the relying system 121.

In embodiments, the relying system 121 optionally communicates an attestation policy 301 (e.g., policy 123 in FIG. 1) to the attestation service 120 (i.e., time (i) in both example 300a/300b). As discussed, the attestation policy 301 comprises one or more criteria that are requested to be attested by the client system 101. In embodiments this includes information the relying system 121 needs to validate in an attestation report produced by the attestation service 120, and to thus decide on whether to proceed in trusting the attested software 115 at the client system 101.

In embodiments, the client system 101 sends a communications request 302 to the relying system 121 (i.e., time (1) in both example 300a/300b). In embodiments the communications request 302 is a request for communication of some resource provided by the relying system 121, such as a gaming resource, a decryption key, etc. In embodiments the relying system 121 only communicates such a resource to the client system 101 if the relying system 121 can validate that a particular component at the client system 101 (e.g., attested software 115) utilizes memory (e.g., read-only protected memory 116) that is protected by a ROMP technology, such as KDP, TrustZone, SGX, HLAT, and the like. For example, the relying system 121 may wish to verify that the attested software 115 utilizes read-only protected memory 116 to verify the integrity of an anti-cheating driver, a media playback driver, and the like.

In embodiments, the client system 101 receives a nonce 303a generated by the relying system 121, and a nonce 303b generated by the attestation service 120. In example 303a, the relying system 121 generates nonce 303a, and sends that nonce 303a to the client system 101 at time (2); the client system 101 then sends an attestation request 310 to the attestation service 120 at time (3), and the attestation service 120 replies by generating and sending a nonce 303b to the client system 101 at time (4). In example 303b, on the other hand, the relying system 121 sends an attestation request 310 to the attestation service 120 at time (2), the attestation service 120 replies by generating and sending a nonce 303b to the relying system 121 at time (3), and the relying system 121 then sends both nonces 303a/303b to the client system 101 at time (4). In embodiments each nonce is some unpredictable value, such as a randomly (or pseudo-randomly) generated value. As will be appreciated by one of ordinary skill on the art, use of nonce 303*a* enables the relying system 121 to avoid replay attacks, in which a malicious party attempts to present a previously valid attestation report, while use of nonce 303*b* enables the attestation service 120 to avoid replay attacks, in which a malicious party attempts to present old attestation evidence.

At time (5) in both examples 303*a*/303*b*, the client system 101 sends attestation evidence 304 toward the attestation service 120. In example 300*a*, the client system 101 sends the attestation evidence 304 to the attestation service 120 directly, while in example 300*b* the client system 101 sends the attestation evidence 304 to the relying system 121, and the relying system then forwards the attestation evidence 304 to the attestation service 120 at time (6). In either embodiment, the measurement component 124 gathers measurements at the client system 101, the evidence generation component 125 generates the attestation evidence 304 from those measurements, and the OS kernel 112 then sends that evidence (over the network 122 or via the hypervisor 108) to at least one of the relying system 121 or the attestation service 120. In embodiments the attestation evidence 304 comprises a key 307, one or more attested properties 308, the nonces 303*a*/303*b*, and a system security claim 309.

In embodiments the secure kernel 117 generates a private/public key pair (e.g., SKA and PKA), and the key 307 is the public key in this pair. In embodiments the attested properties 308 comprise one or more of a binary image name (for the binary or binaries corresponding to the 115), a digital signature (e.g., of the binary image) at load time of the binary image, a base offset and size of the read-only protected memory 116 and its attributes (e.g., whether the binary image can be unloaded, whether a read-only protected memory section is freeable or non-freeable, etc.), a status of secure ROMP technology (e.g., KDP TrustZone, SGX, HLAT, etc.) protecting an underlying virtual address to guest physical address mapping of the protected physical pages, a list of physical pages in memory 104 backing the read-only protected memory 116, a section name and index a driver that has been made read-only, an indication of the content of the read-only protected memory 116 (e.g., a checksum or a hash), or a range list of the read-only protected memory 116 (which in embodiments allows dynamic content to not be included in the attestation report). In embodiments the system security claim 309 is a signed TPM claim, which in implementations comprises a blob of data including the platform configuration registers (PCRs) of the TPM 107 and a TCG log (which contains a log of what has been measured). In embodiments the TPM claim is signed by an attestation identity key ($A_{IK}$) held in the TPM 107.

In embodiments the attestation component 119 signs the attestation evidence 304. In some implementations, the attestation evidence 304 is signed using a system $IDK_S$ (e.g., a VSM master key). In embodiments a public portion of the $IDK_S$ is stored in the TPM measurements, which means that the attestation service 120 can verify that the IDK is genuine and resides in VTL 1. In embodiments the secure kernel 117 returns the attestation evidence 304, together with a certificate issued to the TPM 107 by the attestation service 120 (e.g., a Microsoft Attestation CA ($CERT_{TPM}$)), to the OS kernel 112. The OS kernel 112 then sends the attestation evidence 304 and relevant certificate(s) to the attestation service 120.

Based on receiving the attestation evidence 304, the attestation service 120 sends an attestation report 305 to at least one of the relying system 121 or the client system 101. In example 300*a*, the attestation service 120 sends the attestation report 305 to the client system 101 at time (6), and the client system 101 sends the attestation report 305 to the relying system 121 at time (7). In example 300*b*, the attestation service 120 sends the attestation report 305 to the relying system 121 at time (7). Regardless, the relying system 121 receives the attestation report 305. For example, based on receiving the attestation evidence 304, the attestation service 120 verifies the integrity of the attestation evidence 304. In embodiments the verification includes verifying that the nonce 303*b* included in the attestation evidence 304 matches the nonce 303*b* generated by the attestation service 120 (i.e., at time (4) in example 300*a*, or time (3) in example 300*b*).

In embodiments the verification includes verifying a certificate chain of the TPM certificate (e.g., $CERT_{TPM}$) received along with the attestation report 305, which allows the $A_{IK}$ to be treated as trustworthy. In embodiments the verification also includes validating the PCRs and TCG log of the TPM 107, to ensure that the TPM measurements in the system security claim 309 are valid and trusted. In embodiments the verification also includes parsing the TCG log, re-creating the same PCR values, and checking that the re-created values from the TCG log corresponds to the received ones; if they match, it means that the TCG log and TPM can be treated as trusted. In embodiments the verification also includes checking that the $IDK_S$ can be used to verify the signature of the evidence. In embodiments this process involves validating that the $IDK_S$ (public key) is the same as the one measured in the TPM 107, which ensures that the $IDK_S$ is the one that was measured at boot time. In embodiments, after this validation, the attestation service 120 knows that the public part of the $IDK_S$ is authentic, because only the authentic private key part of the $IDK_S$ was able to sign the attestation evidence 304. As such, the attestation service 120 can infer that the attestation evidence 304 is authentic.

Additionally, in embodiments the attestation service 120 uses the attestation policy 301 (defined by the relying system 121) to accept or reject the attested properties 308 contained in the attestation evidence 304. For example, the relying system 121 can request rejection of the attestation evidence 304 if Secure Boot (or similar technology) is disabled, if the attested software 115 uses the read-only protected memory 116 on the wrong memory page, etc. If the attestation service 120 accepts the attestation evidence 304, then the attestation service 120 creates the attestation report 305 which includes the properties that it has previously verified (e.g., attested properties 308), potentially with the nonce 303*a*, and sends the attestation report 305 the client system 101 (e.g., time (6) in example 300*a*) or to the relying system 121 (i.e., time (7) in example 300*b*). In embodiments the attestation service 120 signs the attestation report 305 and also sends the certificate used for the signing.

Notably, there could be different embodiments of validation of the nonce 303*a*. In one embodiment, the attestation service 120 includes the nonce 303*a* in the attestation report 305 (i.e., as shown in FIGS. 3A/3B), so that the relying system 121 can validate that the nonce 303*a* matches the nonce it set to the client system 101. In another embodiment, the service attestation service 120 validates the nonce 303*a* nonce as part of its attestation.

Regardless of how the attestation report 305 makes it to the relying system 121, the relying system 121 verifies the attestation report 305. In particular, the relying system 121 potentially verifies that the nonce 303*a* included in the attestation report 305 matches the nonce 303*a* previously generated by the relying system 121. If the nonces match, the relying system 121 determines that the attestation report 305 has not been sent from a malicious party as a replay attack. The relying system 121 also verifies the signature on the attestation report 305, to verify that it came from the attestation service 120. Once these verifications are successful, the relying system 121 uses the attested properties 308 to verify that the attested software 115 utilizes read-only protected memory 116 in a manner desired by the relying system 121. If so, then at time (8) in both examples 300a/300b the relying system 121 engages in a relying communication 306 with the client system 101.

As used herein, the relying communication 306 is a communication between the relying system 121 and the client system 101 that the relying system 121 would not engage in without having first verified that the attested software 115 at the client system 101 utilizes read-only protected memory 116 in a manner desired by the relying system 121. For example, the relying communication 306 may involve sending the client system 101 a sensitive resource, such as a decryption key, that the relying system 121 only sends to the client system 101 after verifying that the attested software 115 at the client system 101 utilizes read-only protected memory 116 in a manner desired by the relying system 121. As another example, the relying system 121 may comprise data that (e.g., due to regulatory requirements) must be encrypted-at-rest, and the relying system 121 only sends such data to the client system 101 after verifying that the attested software 115 at the client system 101 is utilizing non-freeable, read-only protected memory for a configuration setting, and verifies the configuration setting indicates compliance with the encryption-at-rest requirement. In this way, the client may be assured that the encryption-at-rest configuration setting will not be changed between a time-of-check (e.g., attestation or other verification) and time-of-use (e.g., the time of the relying communication).

As mentioned, the attestation component 119 may also include a loading component 126. In embodiments the loading component 126 instructs the OS kernel 112 to load the attested software 115 after receipt of the nonce 303a, if that attested software 115 is not already loaded. Once loaded, the attested software 115 typically requests allocation of read-only protected memory 116 via APIs 113, as described previously.

Figure 4:
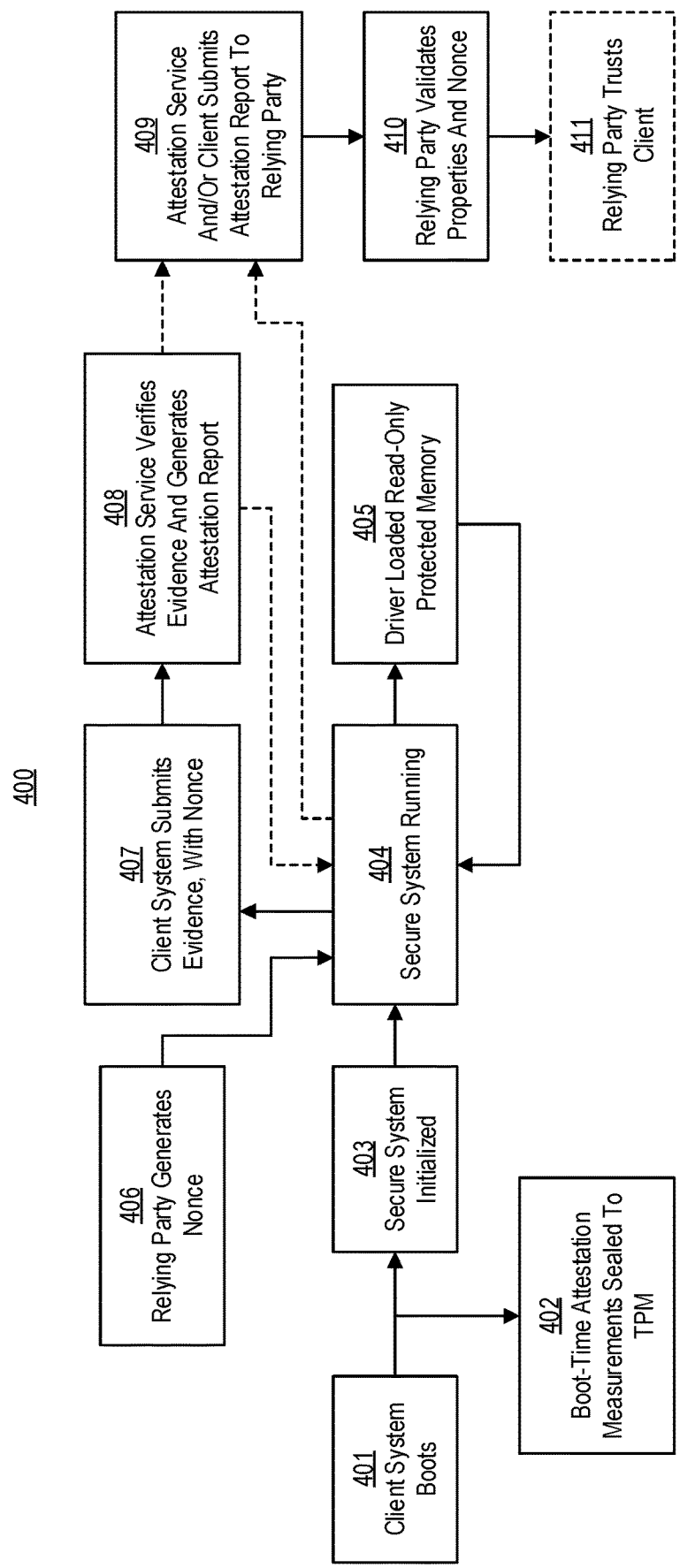
FIG. 4 illustrates an example flow diagram for attesting to read-only protected memory in a distributed system.

To provide additional context for the communications of examples 300a/300b, FIG. 4 illustrates an example flow diagram 400 for attesting to read-only protected memory in a distributed system. In flow diagram 400 a client system (e.g., client system 101) boots at step 401. As part of the boot-up process boot-time attestation measurements are sealed to the TPM 107 (e.g., by the attestation component 119) at step 402. As such, at step 403 a secure system is initialized at the client system. Next, while the secure system runs at step 404, a relying party (e.g., relying system 121) generates a nonce (nonce 303a) at step 406, and this nonce is communicated to the client system. For example, step 406 may correspond to time (2) in example 300a or time (4) in example 300b, in which nonce 303a is sent to the client system by the relying system 121. Additionally, while the secure system runs at step 404, a driver (e.g., attested software 115) loads read-only protected memory (e.g., read-only protected memory 116) at step 405. Step 405 may occur prior to step 406, or after step 406 (e.g., in which case the loading component 126 loads the attested software 115).

Based on receiving the nonce generated in step 406, the client system submits evidence (e.g., attestation evidence 304), along with the nonce, at step 407. This evidence includes properties relating to the driver loaded read-only protected memory in the attestation report. For example, step 407 may correspond to time (5) in examples 300a/300b, in which the client system 101 sends the attestation evidence 304 towards the attestation service 120, either directly or via the relying system 121. At step 408, the attestation service verifies the evidence and generates an attestation report (e.g., attestation report 305). At step 409, the attestation service and/or the client system submits the attestation report to the relying party. For example, step 409 may correspond to time (7) in examples 300a/300b. At step 410, the relying party validates the properties (including properties relating to the driver loaded read-only protected memory in the attestation report), and the nonce; if verified, the relying party trusts the client at step 411. This trust is demonstrated at time (8) of examples 300a/300b in which the relying system 121 engages in a relying communication 306 with the client system 101.

As mentioned, the attestation component 119 may also include a remediation component 127. In embodiments the remediation component 127 ensures that, when the attestation report 305 is valid, the attested software 115 cannot operate contrary to the attested properties in the attestation report 305. In particular, it is noted that in embodiments the attestation report 305 has a finite validity window during which the client system 101 can rely on the attested properties 308 regarding a ROMP status the attested software 115. For example, a validity window may be based on a particular time at which an attestation report becomes invalid, a particular post-issuance validity time limit, etc. However, it may be possible for the attested-to ROMP status of the attested software 115 to change at the client system 101 during this validity window. In one example, the attested software 115 could be terminated or reloaded. If reloaded, the reload could potentially change the code executing as attested software 115 (e.g., due to a software update, a malicious code modification, etc.), and/or the state of the read-only protected memory 116 (e.g., location, size, contents, etc.). In another example (e.g., when using dynamic KDP), the read-only protected memory 116 could be freed. If these situations were to occur, the relying system 121 could rely on attested properties of the attested software 115 and/or the read-only protected memory 116 that are no longer valid until the end of validity of the attestation report 305.

Thus, in some scenarios it may be desired for the client system 101 to not only attest to the configuration and current protected memory (e.g., read-only protected memory 116), but to also monitor the current state of the client system 101 and ensure those attestations remain valid. In embodiments the attestation component 119 therefore comprises the remediation component 127 which ensures that the attested software 115 operates according to the assertions made in the attestation report 305 during validity of the attestation report 305. In embodiments the remediation component 127 also takes proactive remedial actions at the client system 101 if attested-to properties regarding a ROMP status for the attested software 115 are no longer valid during the attestation validity period. Thus, these embodiments operate to enforce attestation of read-only protected memory during attestation validity period.

As shown, the remediation component 127 comprises a state change detection component 128, which operates to identify a change in a ROMP status for the attested software 115 loaded at the client system 101. For example, the state change detection component 128 detects when the attested software 115 has been reloaded, when the read-only protected memory 116 has been freed, etc.

The remediation component 127 also comprises an attested property validity determination component 129, which determines whether a validity time period of a corresponding attestation report is expired or unexpired and, if unexpired, whether at least one ROMP attested property for the attested software 115 is no longer valid due to the change in the ROMP status.

When there is an unexpired attestation report, changes that can make a ROMP attested property for the attested software 115 no longer valid can vary. Some examples of such changes include (i) unloading the attested software 115, (ii) freeing an existing read-only protected section (e.g., the read-only protected memory 116) while allowing additional allocations by the attested software 115 without remediation, (iii) a new allocation of a read-only protected memory section by the attested software 115 while allowing freeing of the newly allocated section without remediation, (iv) freeing an existing read-only protected section (e.g., the read-only protected memory 116) or freeing a new allocation of a read-only protected memory section, (iv) detection of active malware signals with respect to the attested software 115, (v) a change in the system security state that changes state from what was attested in a system security claim (e.g., system security claim 309), and the like. In embodiments, one or more of these changes are tracked per-virtual machine, per-address space identifier, per-process, or per partition, while in other embodiments these changes are tracked globally.

The remediation component 127 also comprises a remedial action component 130 which takes one or more remedial actions when the state change detection component 128 detects a state change, and when attested property validity determination component 129 identifies an unexpired attestation report and an attested property that no longer valid due to the state change. For example, if the ROMP status for the attested software 115 changes during an attestation validity period of the attestation report 305, remedial action(s) taken by the remediation component 127 may include suspending the attested software 115 until the end of the attestation validity period, terminating the attested software 115, blocking communications from the attested software 115 (e.g., communications to the relying system 121), notifying the relying system 121 of the change in ROMP status, signaling an endpoint protection system (e.g., Windows Defender), obtaining a new attestation report (which would allow resumption or recreation of the processes that relied upon the prior attestation), and the like.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 5:
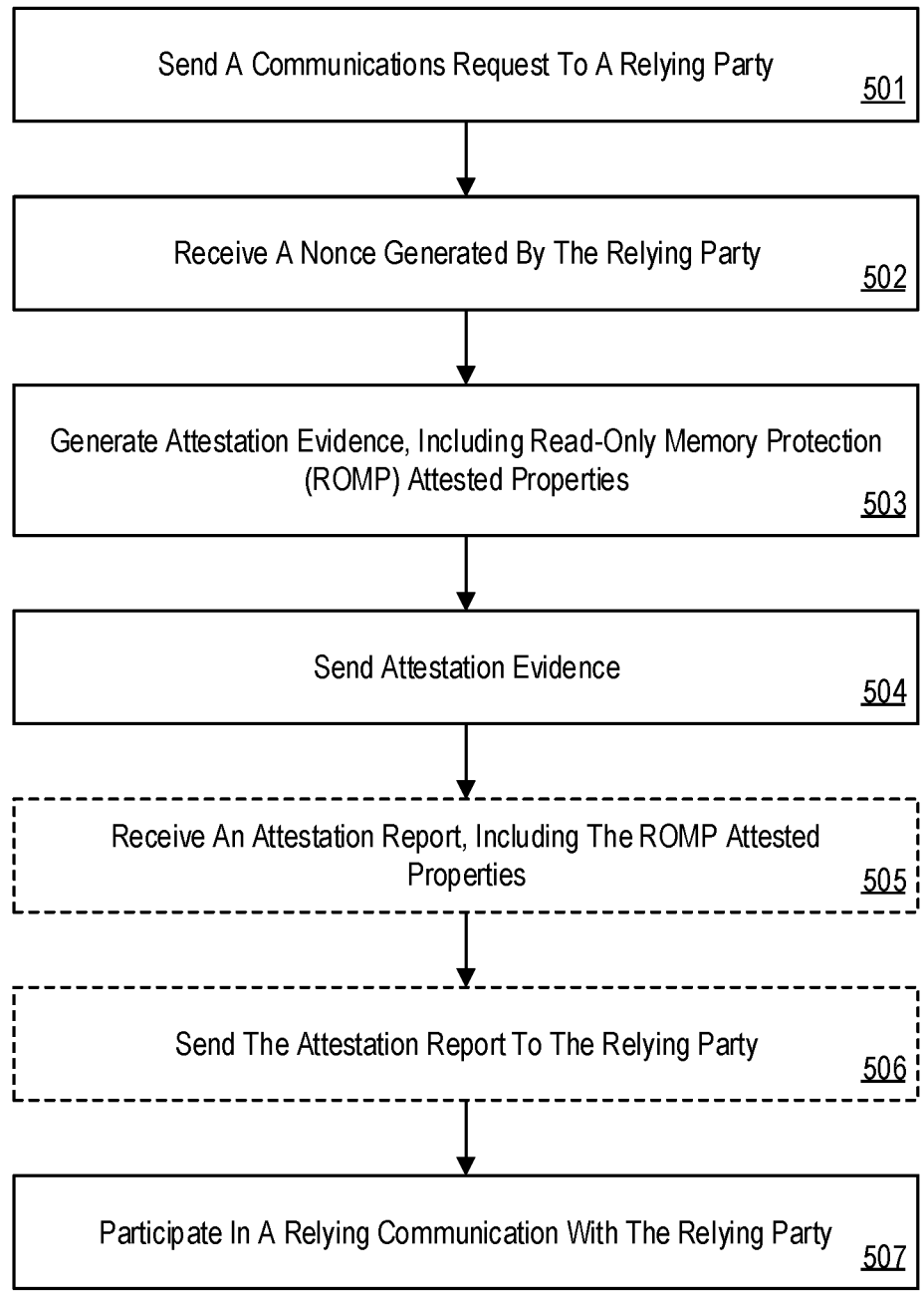
FIG. 5 illustrates a flow chart of an example method for attesting to read-only protected memory.

FIG. 5 illustrates a flow chart of an example method 500 for attesting to read-only protected memory. Method 500 will be described with respect to the components and data of distributed system architecture 100. In embodiments instructions for implementing method 500 are encoded as computer-executable instructions (e.g., attestation component 119, OS kernel 112) stored on a hardware storage device (e.g., storage 105) that are executable by a processor (e.g., processor 103) to cause a computer system (e.g., client system 101) to perform method 500.

In at least some embodiments, method 500 comprises an act 501 of sending a communications request to a relying party. In some embodiments act 501 comprises sending a communications request to a relying party computer system, the communications requesting access to a resource at the relying party computer system. In an example, and as illustrated at time (1) in examples 300a/300b, based on a request from the attested software 115 the OS kernel 112 sends a communications request 302 to the relying system 121. In general, the communications request 302 comprises a request for communication of some resource provided by the relying system 121, such as a gaming resource, a decryption key, etc. In embodiments the relying system 121 will only participate in such a communication if it can verify that it can rely on the security/integrity of the attested software 115. Thus, based on communications request 302, the relying system 121 initiates attestation of the attested software 115 by generating a nonce 303a and by sending the nonce 303a towards the client system 101. As discussed in connection with time (2) of example 300a and time (4) of example 300b, the relying system 121 sends the nonce 303a to the client system 101. Technical effects of act 501 include the initiation of an attestation of the attested software 115 by the relying system 121.

Based on the request in act 501, method 500 comprises an act 502 of receiving a nonce from the relying party. In some embodiments act 502 comprises, based on a communications request, receiving a nonce from the relying party computer system. In an example, the OS kernel 112 receives the nonce 303a over the network 122, via the hypervisor 108 (e.g., when the relying system 121 executes in a secured context), etc. The OS kernel 112 may receive the nonce 303a from the relying system 121 directly, or via the attestation service 120. While the nonce 303a can comprise a variety of data sizes and types, in embodiments the nonce 303a is some unpredictable value, such as a randomly (or pseudo-randomly) generated value. Technical effects of act 502 comprise communication of a secret from the relying system 121, which is later usable by the relying system 121 to validate that an attestation report (attestation report 305) is not being reused/replayed by the client system 101.

As discussed, in some embodiments the attestation component 119 may also include a loading component 126, which instructs the OS kernel 112 to load the attested software 115 after receipt of the nonce 303a if that attested software 115 is not already loaded. Thus, in some embodiments method 500 comprises loading the software component at the computer system after receiving the nonce.

Method 500 comprises an act 503 of generating attestation evidence, including ROMP attested properties. In some embodiments act 503 comprises generating attestation evidence, the attestation evidence comprising: one or more attested properties, including one or more ROMP attested properties for read-only protected memory allocated to a software component loaded at the computer system, the nonce, and a system security claim. In an example, the OS kernel 112 conveys the nonce 303a received in act 502 to the attestation component 119. The attestation component 119, in turn, uses the measurement component 124 to collect the attested properties 308 and the system security claim 309 (e.g., a TPM claim), and uses the evidence generation component 125 to generate attestation evidence 304 from that gathered information. As discussed, the attested properties 308 comprise information relating to the read-only protected memory 116 allocated to the attested software 115. Technical effects of act 503 include generation of evidence that can be used as the basis of an attestation report.

In embodiments, the one or more ROMP attested properties for the software component comprise one or more of a name of a binary image corresponding to the software component, a version of the binary image, or a digital signature at load time of the binary image. When included in an attestation report 305, this information enables the relying system 121 to verify what code is executing as part of attested software 115.

Additionally, or alternatively, the one or more ROMP attested properties for the software component comprise one or more of a base offset of a read-only protected memory section allocated to the binary image, or a size of the read-only protected memory section. When included in an attestation report 305, this information enables the relying system 121 to verify a size and/or location of the read-only protected memory 116.

Additionally, or alternatively, the one or more ROMP attested properties for the software component comprise an attribute of the read-only protected memory section. In embodiments this attribute is an unload ability (e.g., whether the binary image can be unloaded), whether the read-only protected memory section is freeable or non-freeable, etc. When included in an attestation report 305, this information enables the relying system 121 to determine whether or not the attested software 115 can be unloaded.

Additionally, or alternatively, the one or more ROMP attested properties for the software component comprise a status of a ROMP technology protecting a virtual to physical address mapping (e.g., guest physical addresses). When included in an attestation report 305, this information enables the relying system 121 to determine how read-only protected memory 116 has been established.

Additionally, or alternatively, the one or more ROMP attested properties for the software component comprise a set of physical pages underlying the read-only protected memory section. When included in an attestation report 305, this information enables the relying system 121 to determine what portion(s) of memory 104 are used to back read-only protected memory 116.

Additionally, or alternatively, the one or more ROMP attested properties for the software component comprise an indication of content of the read-only protected memory section. In embodiments, this indication is one or more of a checksum, a hash, or a cryptographic hash. When included in an attestation report 305, this information enables the relying system 121 to determine content of the read-only protected memory 116.

Additionally, or alternatively, the one or more ROMP attested properties for the software component comprise a range list of the content of the read-only protected memory section. When included in an attestation report 305, this information enables the attestation component 119 to exclude dynamic content from being specified in the attestation report.

Method 500 comprises an act 504 of sending attestation evidence. In some embodiments act 503 comprises sending the attestation evidence toward an attestation service computer system. In an example, the OS kernel 112 sends the attestation evidence 304 over the network 122, or via the hypervisor 108 (e.g., when the relying system 121 executes in a secured context), towards the attestation service 120. As illustrated at time (5) of examples 300a/300b, this can include sending the attestation evidence 304 to the attestation service 120 directly, or through the relying system 121. Technical effects of act 504 include relaying information usable by the attestation service 120 to verify and attest to the presence/state of read-only protected memory 116 as it relates to attested software 115.

After the client system 101 sends the attestation evidence 304, the attestation service 120 validates the attestation evidence 304 as described supra and generates an attestation report 305. At shown in examples 300a/300b, the attestation service 120 sends the attestation report 305 to client system 101 (i.e., time (6) in example 300a) or to the relying system 121 (i.e., time (7) in example 300b). In embodiments, this attestation report 305 includes the one or more ROMP attested properties are included in the attestation report. In some embodiments these ROMP attested properties are included in the attestation report 305 based at least on a policy 123 sent to the attestation service 120 by the relying system 121 (e.g., time (i) in examples 300a/300b). Thus, in some embodiments the one or more ROMP attested properties are included in the attestation report based on a validation against an attestation policy defined by the relying party computer system.

In at least some embodiments, method 500 comprises an act 505 of receiving an attestation report, including the ROMP attested properties. In some embodiments act 505 comprises, based at least on sending the attestation evidence, the computer system receiving an attestation report generated by the attestation service computer system, the attestation report comprising the one or more attested properties and the nonce. For instance, example 300a illustrates at time (6) that the attestation service 120 sends the attestation report 305 to the client system 101 It is noted that in some embodiments act 505 is optional. In particular, the attestation service 120 may send the attestation report 305 directly to the relying system 121 (e.g., time (7) in example 300b), and the relying system 121 may not forward the relying system 121 to the client system 101.

In at least some embodiments, and when act 505 occurs, method 500 comprises an act 506 of sending the attestation report to the relying party. In some embodiments act 506 comprises sending the attestation report to the relying party computer system prior to participating in the relying communication with the relying party computer system. For instance, example 300a illustrates that at time (6) that the attestation service 120 sends the attestation report 305 to the client system 101, and that at time (7) the client system 101 sends the attestation report 305 to the relying system 121.

Method 500 comprises an act 507 of participating in a relying communication with the relying party. In some embodiments act 507 comprises based on sending the attestation evidence to the attestation service computer system, participating in a relying communication with the relying party computer system. In an example, based on verifying the attestation report 305, including verifying the attested properties 308 included in the attestation report 305, the relying system 121 determines that it can rely on attested software 115 and communicate with client system 101. Thus, on behalf of the attested software 115, the OS kernel 112 participates in the relying communication 306 with the relying system 121 (e.g., over the network 122 or via the hypervisor 108). In embodiments, this relying communication 306 communicates the resource requested in act 501. Technical effects of act 507 include communication of a data resource between an attested software 115 that utilizes read-only protected memory 116 and a relying system 121 that has validated the use of the read-only protected memory 116 by the attested software 115.

As discussed, although illustrated separately, in some embodiments the attestation service 120 and the relying system 121 are combined into the same computer system. As such, in some embodiments of method 500 the relying party computer system comprises the attestation service computer system, or the attestation service computer system comprises the relying party computer system. As also discussed, although illustrated as being separated from the client system 101 by network 122, in some embodiments the relying system 121 executes within a secured context executing at client system 101. Thus, in some embodiments of method 500 the relying party computer system executes within a secured context at the computer system.

Accordingly, embodiments described herein attest to read-only protected memory in a distributed system. These embodiments enable generation of an attestation report that certifies that a software component executing at a client system is protected by a ROMP technology. This attestation report comprises attested properties relating to the ROMP status of this software component. A relying system uses this attestation report to verify these properties prior to sending data to the client system and/or prior to relying on data received by the client system. Technical effects of attesting to read-only protected memory in a distributed system include allowing verifiable assurances to be made of system state (e.g., state of a client system), improving the foundational capabilities for secure computing. These assurances, in turn, enable a relying system to objectively gauge its level of trust in the client system, which facilitates secure data communications between the client system and the relying system.

Figure 6:
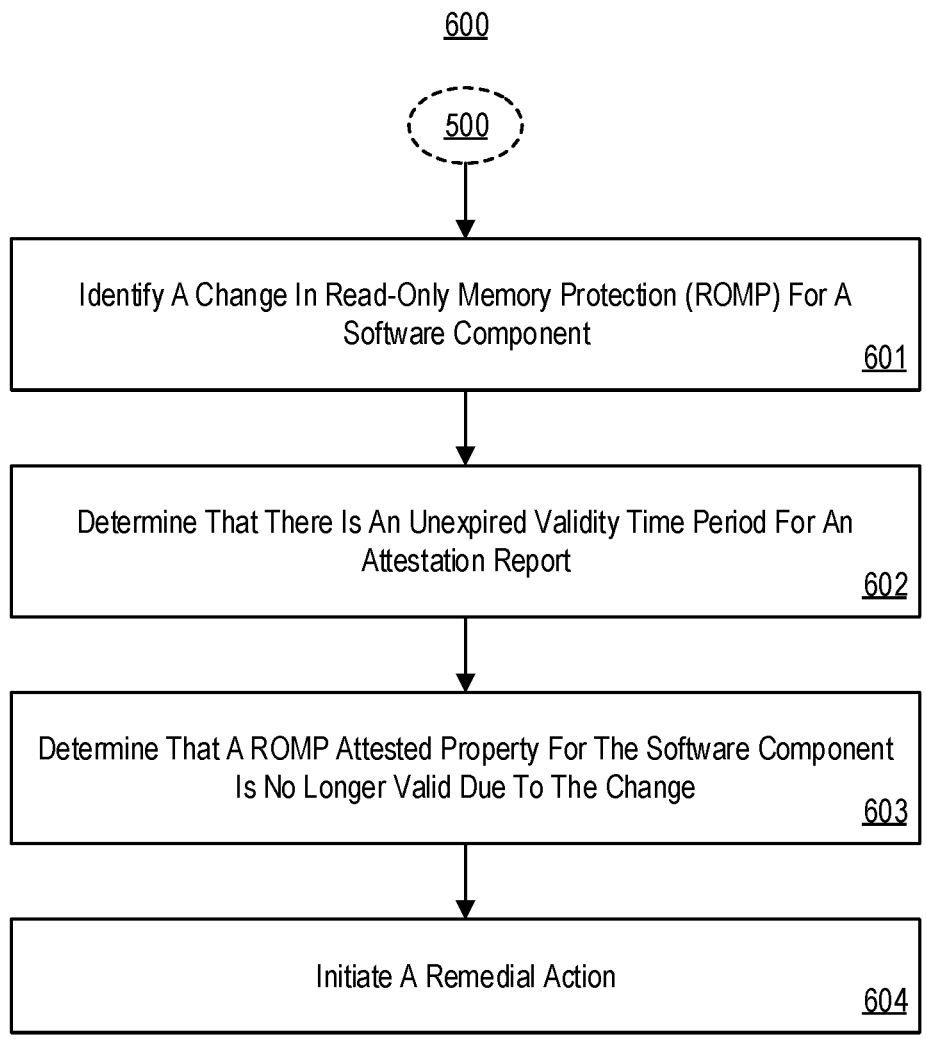
FIG. 6 illustrates a flow chart of an example method for enforcing attestation of read-only protected memory during attestation validity period.

FIG. 6 illustrates a flow chart of an example method 600 for enforcing read-only protected memory during an attestation validity period. Method 600 will be described with respect to the components and data of distributed system architecture 100. In embodiments instructions for implementing method 600 are encoded as computer-executable instructions (e.g., remediation component 127) stored on a hardware storage device (e.g., storage 105) that are executable by a processor (e.g., processor 103) to cause a computer system (e.g., client system 101) to perform method 600.

As shown, method 600 can begin after completion of method 500—which causes generation of an attestation report 305 that includes attested properties for one or more of attested software 115 and read-only protected memory 116. Thus, in some embodiments method 600 can be viewed as an extension to method 500.

Method 600 comprises an act 601 of identifying a change in ROMP for a software component. In some embodiments act 601 comprises identifying a change in a ROMP status for a software component loaded at the computer system. In an example, the remediation component 127 detects a change in one, or both of attested software 115 and read-only protected memory 116. For instance, a change in attested software 115 can include an unloading of attested software 115, a reloading of attested software 115, a change in a binary image corresponding to attested software 115, etc. A change in read-only protected memory 116 can include freeing of read-only protected memory 116 (e.g., based on use of dynamic KDP, based on reloading of attested software 115, etc.). Technical effects of act 601 include detection of a change at client system 101 that could render one or more attested properties in the attestation report 305 generated in method 500 invalid while it is unexpired.

Method 600 also comprises an act 602 of determining that there is an unexpired validity time period for an attestation report. In some embodiments act 602 comprises determining that a validity time period of an attestation report is unexpired, the attestation report comprising one or more attested properties, including one or more ROMP attested properties for read-only protected memory allocated to the software component. In an example, the attested property validity determination component 129 identifies attestation report 305 corresponding to attested software 115 and/or read-only protected memory 116. Technical effects of act 602 include detection of an attestation report 305 that is relevant to the state change detected in act 601.

Method 600 also comprises an act 603 of determining that a ROMP attested property for the software component is no longer valid due to the change. In some embodiments act 603 comprises determining that at least one ROMP attested property for the software component is no longer valid due to the change in the ROMP status for a software component. In an example, the attested property validity determination component 129 identifies one or more of the attested properties 308 that are no longer valid due to the state change detected in act 601. Technical effects of act 603 include detection of an attested property that, while presently attested to in the attestation report 305, is no longer valid at client system 101.

Method 600 also comprises an act 604 of initiating a remedial action. In some embodiments act 604 comprises, based on the at least one ROMP attested property for the 30) software component being no longer valid, initiating a remedial action to prevent interaction of the software component with a relying party computer system. In an example, the remedial action component 130 initiates a remedial action to prevent reliance by the relying system 121 on the attested software 115. Technical effects of act 604 include preventing the relying system 121 from interacting with the attested software 115 which the attested software 115 is not operating under the attested conditions included in the attestation report 305.

In some embodiments, the remedial action prevents interaction of the software component with the relying system 121 until at least expiration of the validity time period. In some embodiments, the remediation prevents the interaction only if the interaction was based on the attestation report identified in act 602. For instance, if a new attestation report is generated with the updated ROMP attested properties, then in some embodiments the expiration of the prior attestation report's validity time period is not relevant. Thus, in examples, the prior attestation report could have been linked to specific encryption keys being used, and the embodiments herein allow revocation, destruction, inaccessibility, etc. of those keys.

In some embodiments the remedial action in act 604 comprises suspending one or more processes corresponding to software component. For example, the remedial action component 130 suspends one or more processes executing within the context of the OS kernel 112, and that correspond to attested software 115. This has a technical effect of preventing the attested software 115 from communicating with the relying system 121, since the attested software 115 is no longer actively executing at the client system 101.

In additional, or alternative, embodiments, the remedial action in act 604 comprises resuming the one or more processes after expiration of the validity time period. For example, the remedial action component 130 resumes one or more processes executing within the context of the OS kernel 112, and that correspond to attested software 115. This has a technical effect of enabling the attested software 115 to again operate. However, since the attestation report 305 is now expired, the relying system 121 is not at risk of relying on an attested property that is no longer valid.

In additional, or alternative, embodiments, the remedial action in act 604 terminating one or more processes corresponding to software component. For example, the remedial action component 130 terminates one or more processes executing within the context of the OS kernel 112, and that correspond to attested software 115. This has a technical effect of preventing the attested software 115 from communicating with the relying system 121, since the attested software 115 is no longer present at the client system 101.

In additional, or alternative, embodiments, the remedial action in act 604 comprises blocking one or more communications from the software component. For example, the remedial action component 130 blocks one or one more network communications or hypercalls generated by (or on behalf of) the attested software 115, and which are destined for the relying system 121. This has a technical effect of preventing the attested software 115 from communicating with the relying system 121, since the communications from the attested software 115 cannot reach the relying system 121.

In additional, or alternative, embodiments, the remedial action in act 604 permitting communications by the software component after expiration of the validity time period. For example, the remedial action component 130 permits one or one more network communications or hypercalls generated by (or on behalf of) the attested software 115 after a validity period for the attestation report 305 has expired. This has a technical effect of enabling the attested software 115 to again communicate with the relying system 121. However, since the attestation report 305 is now expired, the relying system 121 is not at risk of relying on an attested property that is no longer valid.

In additional, or alternative, embodiments, the remedial action in act 604 comprises initiating obtaining of a new attestation report. In an example, the remedial action component 130 contacts one, or both, of the relying system 121 or the attestation service 120 in order to obtain a new attestation report. This has a technical effect of proactively reducing a period during which the relying system 121 is prevented from interacting with the attested software 115.

In additional, or alternative, embodiments, the remedial action in act 604 comprises notifying a relying party computer system. In an example, the remedial action component 130 contacts the relying system 121 to inform the relying system 121 that an attested-to property is no longer valid. This has a technical effect of enabling the relying system 121 to cease communications with the client system 101.

Accordingly, additional embodiments described herein take proactive remedial actions at the client system if attested-to properties regarding a ROMP status for a software component are no longer valid during an attestation validity period. Thus, these embodiments operate to enforce attestation of read-only protected memory during attestation validity period. Technical effects of enforcing read-only protected memory during an attestation validity period include promoting computer security by ensuring that a relying party can actually rely on attestations made by a client computer system during the entire validity duration of an attestation report.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A computer system for enforcing attestation of read-only protected memory during an attestation validity period, comprising:
   a processor; and
      a hardware storage device that stores computer-executable instructions that are executable by the processor to cause the computer system to at least:
      identify a change in a read-only memory protection (ROMP) status for a software component loaded at the computer system;
      determine that a validity time period of an attestation report is unexpired, the attestation report comprising one or more attested properties, including one or more ROMP attested properties for read-only protected memory allocated to the software component;
      determine that at least one ROMP attested property for the software component is no longer valid due to the change in the ROMP status for a software component;
      based on the at least one ROMP attested property for the software component being no longer valid, initiate a remedial action to prevent interaction of the software component with a relying party computer system, the remedial action comprising blocking a communication from the software component; and
      permit communication by the software component after expiration of the validity time period.

2. The computer system of claim 1, wherein the remedial action also comprises suspending one or more processes corresponding to the software component.

3. The computer system of claim 2, wherein the computer-executable instructions are also executable by the processor to cause the computer system to resume the one or more processes after expiration of the validity time period.

4. The computer system of claim 1, wherein the remedial action also comprises terminating one or more processes corresponding to the software component.

5. The computer system of claim 1, wherein the remedial action also comprises initiating obtaining a new attestation report.

6. The computer system of claim 1, wherein the remedial action also comprises notifying the relying party computer system.

7. A method, implemented at a computer system that comprises a processor for enforcing attestation of read-only protected memory during an attestation validity period, the method comprising:
   identifying a change in a read-only memory protection (ROMP) status for a software component loaded at the computer system;
   determining that a validity time period of an attestation report is unexpired, the attestation report comprising one or more attested properties, including one or more ROMP attested properties for read only protected memory allocated to the software component;

determining that at least one ROMP attested property for the software component is no longer valid due to the change in the ROMP status for a software component;

based on the at least one ROMP attested property for the software component being no longer valid, initiating a remedial action to prevent interaction of the software component with a relying party computer system, the remedial action comprising blocking a communication from the software component; and permit communication by the software component after expiration of the validity time period.

8. The method of claim 7, wherein the remedial action also comprises suspending one or more processes corresponding to the software component.

9. The method of claim 8, further comprising resuming the one or more processes after expiration of the validity time period.

10. The method of claim 7, wherein the remedial action also comprises terminating one or more processes corresponding to the software component.

11. The method of claim 7, wherein the remedial action also comprises
initiating obtaining a new attestation report.

12. The method of claim 7, wherein the remedial action also comprises notifying the relying party computer system.

13. A hardware storage device that stores computer-executable instructions that are executable by a processor to cause a computer system to at least: identify a change in a read-only memory protection (ROMP) status for a software component loaded at the computer system;

determine that a validity time period of an attestation report is unexpired, the attestation report comprising one or more attested properties, including one or more ROMP attested properties for read-only protected memory allocated to the software component;

determine that at least one ROMP attested property for the software component is no longer valid due to the change in the ROMP status for a software component;

based on the at least one ROMP attested property for the software component being no longer valid, initiate a remedial action to prevent interaction of the software component with a relying party computer system, the remedial action comprising blocking a communication from the software component; and permit communication by the software component after expiration of the validity time period.

14. The hardware storage device of claim 13, wherein the remedial action also comprises suspending one or more processes corresponding to the software component.

15. The hardware storage device of claim 14, wherein the computer executable instructions are also executable by the processor to cause the computer system to resume the one or more processes after expiration of the validity time period.

16. The hardware storage device of claim 13, wherein the remedial action also comprises terminating one or more processes corresponding to the software component.

17. The hardware storage device of claim 13, wherein the remedial action also comprises initiating obtaining a new attestation report.

18. The hardware storage device of claim 13, wherein the remedial action also comprises notifying the relying party computer system.

* * * * *